(12) United States Patent
Abraham et al.

(10) Patent No.: US 11,675,677 B2
(45) Date of Patent: Jun. 13, 2023

(54) BYZANTINE AGREEMENT USING COMMUNICATIONS HAVING LINEAR COMPLEXITY

(71) Applicant: VMware, Inc., Palo Alto, CA (US)

(72) Inventors: Ittai Abraham, Tel Aviv (IL); Dahlia Malkhi, Palo Alto, CA (US); Alexander Spiegelman, Yoknem (IL); Guy Golan Gueta, Herzliya (IL)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/575,507

(22) Filed: Jan. 13, 2022

(65) Prior Publication Data
US 2022/0138062 A1    May 5, 2022

Related U.S. Application Data

(63) Continuation of application No. 16/680,380, filed on Nov. 11, 2019, now Pat. No. 11,256,581, which is a
(Continued)

(51) Int. Cl.

| | |
|---|---|
| *G06F 11/00* | (2006.01) |
| *G06F 11/20* | (2006.01) |
| *G06F 11/14* | (2006.01) |
| *G06Q 20/06* | (2012.01) |
| *H04L 9/32* | (2006.01) |
| *G06Q 20/38* | (2012.01) |
| *H04L 9/06* | (2006.01) |

(52) U.S. Cl.
CPC ...... *G06F 11/2028* (2013.01); *G06F 11/1479* (2013.01); *G06F 11/2048* (2013.01); *G06Q 20/06* (2013.01); *G06Q 20/382* (2013.01); *H04L 9/0618* (2013.01); *H04L 9/3239* (2013.01); *H04L 9/3255* (2013.01); *G06F 11/202* (2013.01); *G06F 11/2041* (2013.01); *G06Q 2220/00* (2013.01); *H04L 2209/56* (2013.01)

(58) Field of Classification Search
CPC .................. G06F 11/2048; G06F 11/202
See application file for complete search history.

(56) References Cited

U.S. PATENT DOCUMENTS

| | | |
|---|---|---|
| 4,569,015 A | 2/1986 | Dolev et al. |
| 6,128,755 A | 10/2000 | Bello et al. |

(Continued)

OTHER PUBLICATIONS

Ittai Abraham et al., "BVP: Byzantine Vertical Paxos", May 28, 2016, 4 pages.

(Continued)

*Primary Examiner* — Amine Riad (57) ABSTRACT

In some embodiments, a method receives a share of a signature of a decision block from at least a portion of the plurality of replicas. The share of the signature being generated when a respective replica signs the decision block and the decision block includes a set of requests from a client for a service. A combined signature is created based on the share of the signature block from at least the portion of the plurality of replicas. The method broadcasts a message that includes the combined signature to the plurality of replicas. The plurality of replicas use the combined signature to determine whether to process the decision block for the service.

21 Claims, 8 Drawing Sheets

Related U.S. Application Data continuation of application No. 15/653,178, filed on Jul. 18, 2017, now Pat. No. 10,503,614.

(60) Provisional application No. 62/488,536, filed on Apr. 21, 2017.

(56) References Cited

U.S. PATENT DOCUMENTS

| | | | |
|---|---|---|---|
| 6,671,821 | B1 | 12/2003 | Castro et al. |
| 6,931,431 | B2 | 8/2005 | Cachin et al. |
| 8,135,987 | B2 | 3/2012 | Douceur et al. |
| 8,230,253 | B2 | 7/2012 | Butterworth |
| 8,457,300 | B2 | 6/2013 | Hemm et al. |
| 9,224,262 | B2 * | 12/2015 | Fine .................. G07F 17/326 |
| 9,684,554 | B2 | 6/2017 | Candea et al. |
| 9,753,792 | B2 | 9/2017 | Dobre et al. |
| 9,971,823 | B2 | 5/2018 | Vasanth et al. |
| 10,049,017 | B2 | 8/2018 | Karame et al. |
| 10,903,991 | B1 * | 1/2021 | Craige .................. H04L 9/3252 |
| 2007/0214355 | A1 | 9/2007 | Lamport |
| 2010/0318786 | A1 | 12/2010 | Douceur et al. |
| 2013/0283123 | A1 | 10/2013 | Gara et al. |
| 2016/0283123 | A1 | 9/2016 | Dobre et al. |
| 2018/0144340 | A1 | 5/2018 | Kinnaird et al. |
| 2018/0145836 | A1 | 5/2018 | Saur et al. |
| 2018/0157558 | A1 | 6/2018 | Karame et al. |
| 2018/0189755 | A1 | 7/2018 | Kilpatrick et al. |
| 2018/0240114 | A1 | 8/2018 | Li |
| 2018/0307573 | A1 | 10/2018 | Abraham et al. |
| 2019/0251007 | A1 | 8/2019 | Brough |
| 2019/0333030 | A1 | 10/2019 | Ramasamy et al. |
| 2020/0081805 | A1 | 3/2020 | Abraham et al. |
| 2020/0089583 | A1 | 3/2020 | Fletcher |
| 2020/0396081 | A1 | 12/2020 | Ansel et al. |
| 2021/0026745 | A1 | 1/2021 | Wang |
| 2021/0091926 | A1 | 3/2021 | Ramasamy et al. |
| 2022/0067176 | A1 * | 3/2022 | Charles .................. G06F 21/602 |
| 2022/0391410 | A1 * | 12/2022 | Abraham .......... G06F 16/24535 |

OTHER PUBLICATIONS

Leslie Lamport et al., "Vertical Paxos and Primary-Backup Replication", Feb. 9, 2009, 17 pages.

Miguel Castro et al., "Practical Byzantine Fault Tolerance", Proceedings of the Third Symposium on Operating Systems Design and Implementation, OSDI '99, Feb. 1999, 14 pages, Berkeley, CA, USA.

Cynthia Dwork et al., "Pricing via Processing or Combatting Junk Mail", Annual International Cryptology Conference, CRYPTO 1992, Aug. 16-20, 1992, 12 pages.

* cited by examiner

Fig. 7

BYZANTINE AGREEMENT USING COMMUNICATIONS HAVING LINEAR COMPLEXITY

CROSS REFERENCE TO RELATED APPLICATIONS

This application is a continuation application and, pursuant to 35 U.S.C. § 120, is entitled to and claims the benefit of earlier filed application U.S. application Ser. No. 16/680,380 filed Nov. 11, 2019, now U.S Pat. No. 11,256,581 issued Feb. 22, 2022, and earlier filed application U.S. application Ser. No. 15/653,178 filed Jul. 18, 2017, now U.S. Pat. No. 10,503,614 issued Dec. 10, 2019, which in turn is entitled to and claims the benefit of the filing date of U.S. Provisional App. No. 62/488,536 filed Apr. 21, 2017, the content of all of which are incorporated herein by reference in its entirety for all purposes.

BACKGROUND

There are two trends in distributed system that seem to have no current end to. The first is that malicious attacks are becoming increasingly common. The second is that more and more critical infrastructure, information and business is being digitized and moved on-line. It is generally believed that Byzantine fault tolerant (BFT) replication systems will play a major role in providing a core trust infrastructure that will help these two trends better co-exist.

One of the earliest practical systems proposed is aptly referred to as the practical Byzantine fault tolerant (PBFT) protocol that used a novel algorithm, multiple optimizations, and state-of-the-art cryptographic techniques. PBFT can perform well when tuned to tolerate one failure and can scale to withstand a few failures while maintaining good performance. Zyzzyva is another protocol that systematically exploits speculation to improve both latency and throughput. The replication algorithm in Zyzzyva is optimized for a common mode environment, which is characterized by fault free nodes (but may be slow or have crashed altogether) and synchronous communication. Zyzzyva introduces optimizations aimed to reduce the client latency and allow the client to take a larger role in driving the protocol.

Bitcoin and more Ethereum are distributed crypto-currency computing platforms that have had significant impact on the design of distributed ledger systems. They demonstrate that scaling replication to hundreds or even thousands of nodes is feasible and of potentially significant value to society. A core reason why distributed systems like Bitcoin and Ethereum scale so well is because their replication protocol has a linear message complexity per decision block. To make progress, the node who solves the Proof-of-Work (PoW) puzzle just needs to disseminate its message (that includes a decision block and PoW) to all replicas. Reliance on Proof-of-Work has inherent disadvantages, however: It takes tens of seconds if not minutes to add a new decision block and it takes even longer to commit with high certainty. Moreover, the economics of PoW seem to be causing these systems to be controlled by just a handful of powerful coalitions.

There is a growing interest in replacing the PoW mechanism of today's crypto-currencies with techniques that leverage the throughput advantages of Byzantine fault tolerant replication.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

The present disclosure relates to a distributed system used to provide a service to clients. The service is replicated across multiple machines in the distributed system, thus defining a replicated state machine among the replicas. Each "replica" maintains its own data that constitute the state of the service, and executes client request which updates the state of service.

The present disclosure describes a Byzantine fault tolerant replicated state machine protocol that addresses the challenges of scalability. Previous Byzantine fault tolerant systems used a linear number of messages to respond to each client request and quadratic communication for each decision, which may be practical for a small number of replicas but does not scale well for large deployments. A system in accordance with the present disclosure uses a protocol designed to be practical for deployments that can tolerate a few tens of Byzantine failures. In a common mode environment, the protocol can operate using one message with fixed-size overhead to respond to each client request and just a linear number of messages with fixed-size overhead is needed for each decision. The protocol of the present disclosure can tolerate the optimal amount (f) of Byzantine failures and maintain safety even in fully asynchronous environments.

The present disclosure describes a novel practical Byzantine fault tolerant system that can scale to large deployments. The present disclosure describes techniques that can alleviate non-linear complexities which are inherent at various stages of conventional Byzantine fault tolerant solutions. Systems in accordance with the present disclosure have the following technical advantages:

(1) Processing requests in a common mode environment using conventional approaches involves the communication of a quadratic number of messages among replicas for each decision. Conventional systems may employ hash-based message authorization code (HMAC) vectors and RSA signatures. When using HMAC vectors, each message is itself of linear size, and when using RSA signatures, each replica needs to verify a linear number of RSA signatures.

By comparison, processing in accordance with the present disclosure requires only a linear number of messages with a fixed-size overhead for each decision, thus reducing communication loads in the communication network. In accordance with the present disclosure, k-out-of-n threshold signature schemes (techniques) are used to produce a single message with fixed-size overhead and reduce the cost of verifying the message to just one RSA operation.

(2) In a multi-client environment it is typical that each decision block contains a batch of many ($\geq f$) client requests. Conventional systems use a linear number of messages and a linear number of signatures, per client, for request acknowledgement. By comparison, processing in accordance with the present disclosure requires only one message, per client, for request acknowledgement thus reducing communication overhead in each client.

It is noted that when each decision block contains a batch off client requests (or more), then the above contributions (1) and (2) imply that our protocol obtains an overall amortized message complexity of a constant number of messages per client operation.

(3) Conventional systems require accessing a linear number of replicas even in the optimized read paths when there are no failures and the system is synchronous to service client queries. By contrast, query processing in accordance with the present disclosure allows clients to request (read-only) queries by accessing just one replica in the common mode environment. This fast read from any replica provides a new trade-off between consistency and performance in Byzantine fault tolerant systems.

(4) The system of the present disclosure, adopts a hybrid adversary model that can withstand f Byzantine failures, but provides best-case performance in common mode when few $c \leq f$ replicas are slow or have crashed.

The discussion will now turn to embodiments in accordance with the present disclosure. In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
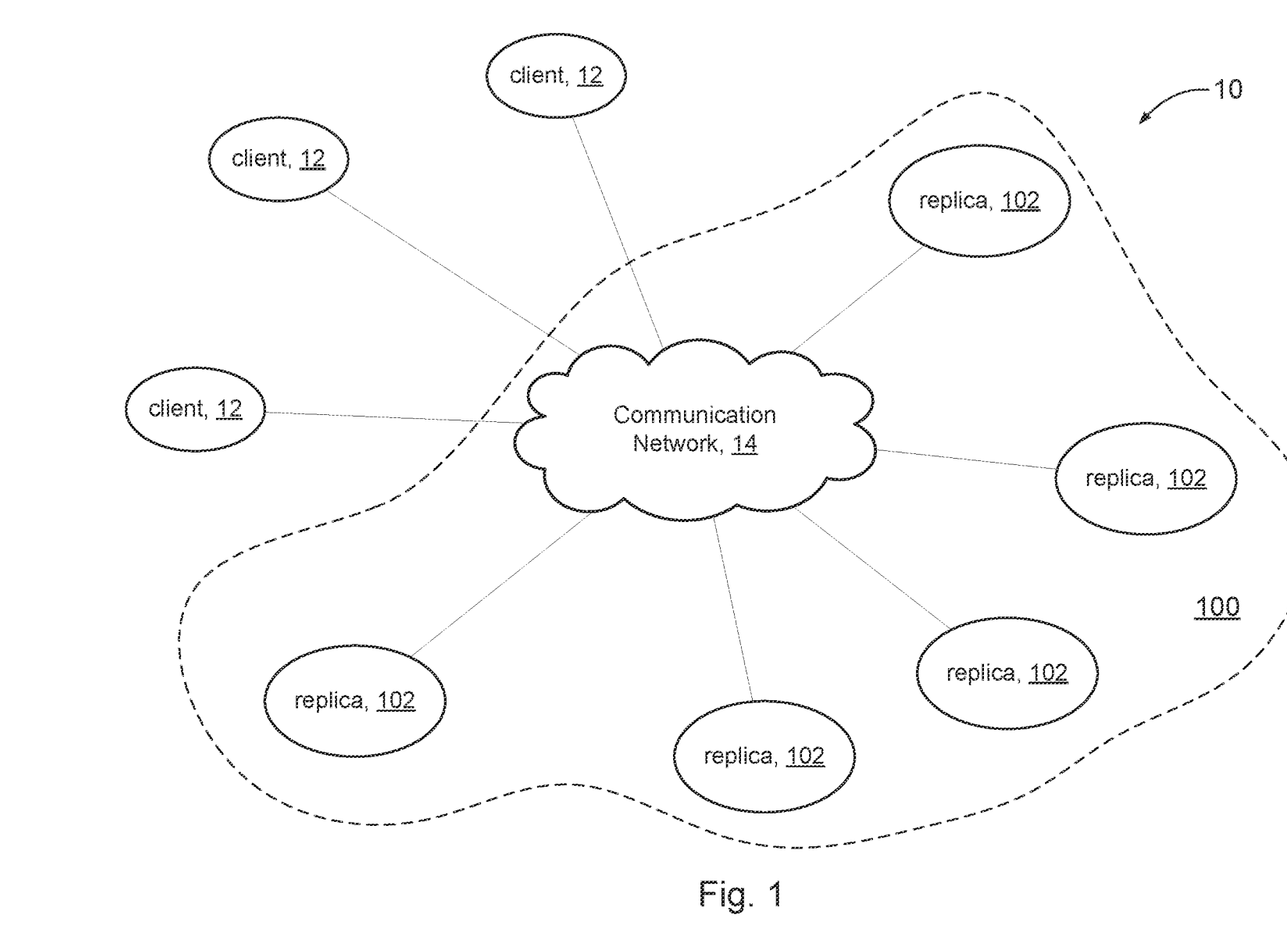
FIG. 1 is a system diagram showing a distributed computing system incorporating a replicated state machine in accordance with the present disclosure.

FIG. 1 illustrates a distributed computing system 10, comprising a distributed arrangement of computing devices interconnected by a communication network 14. The communication network 14 can represent any combination and configuration of a public network (e.g., the Internet) and private networks (e.g., LANs, WANs, etc.), and can include wired connections (e.g., ethernet) and wireless connections (e.g., WiFi).

The distributed computing system 10 includes a replicated state machine 100 comprising computing devices, referred to herein as replicas 102. The replicated state machine 100 can provide a fault-tolerant service for client computing devices 14. A common example can be found in distributed systems, where the service is distributed in order to provide security in the data that is managed by the service. Each replica 102 comprising the replicated state machine 100 maintains its own copy of information (state) relating to the service. Each service receives and processes client requests using its own information, thus updating its own state.

In accordance with the present disclosure, the replicated state machine 100 can operate in accordance with a Byzantine fault tolerant state machine replication protocol that can scale to large numbers of replicas 102 while avoiding non-linear complexities present in conventional systems.

Figure 2:
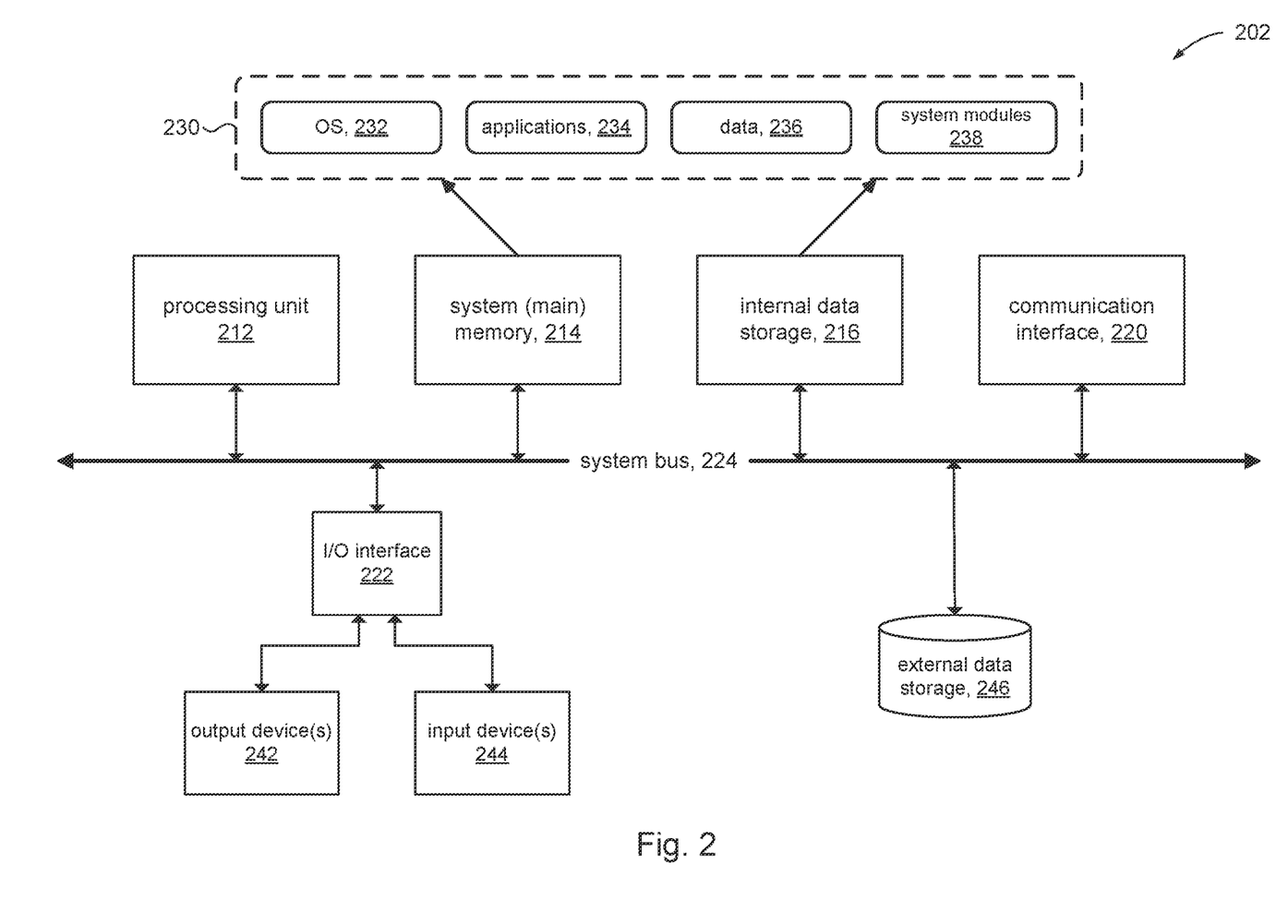
FIG. 2 is an illustrative example of a computer device.

FIG. 2 is a simplified block diagram of an illustrative computing system 202 for implementing a given replica 102 shown in FIG. 1. For example, the computing system 202 may perform and/or be a means for performing, either alone or in combination with other elements, operations in accordance with the present disclosure. Computing system 202 may also perform and/or be a means for performing any other steps, methods, or processes described herein.

Computing system 202 can include any single or multi-processor computing device or system capable of executing computer-readable instructions. Examples of computing system 202 include, for example, workstations, laptops, client-side terminals, servers, distributed computing systems, handheld devices, or any other computing system or device. In a basic configuration, computing system 202 can include at least one processing unit 212 and a system (main) memory 214.

Processing unit 212 can comprise any type or form of processing unit capable of processing data or interpreting and executing instructions. The processing unit 212 can be a single processor configuration in some embodiments, and in other embodiments can be a multi-processor architecture comprising one or more computer processors. In some embodiments, processing unit 212 may receive instructions from program and data modules 230. These instructions may cause processing unit 212 to perform operations in accordance with the present disclosure.

System memory 214 (sometimes referred to as main memory) can be any type or form of volatile or non-volatile storage device or medium capable of storing data and/or other computer-readable instructions. Examples of system memory 214 include, for example, random access memory (RAM), read only memory (ROM), flash memory, or any other suitable memory device. Although not required, in some embodiments computing system 202 may include both a volatile memory unit (such as, for example, system memory 214) and a non-volatile storage device (e.g., data storage 216, 246).

In some embodiments, computing system 202 may also include one or more components or elements in addition to processing unit 212 and system memory 214. For example, as illustrated in FIG. 2, computing system 202 may include internal data storage 216, a communication interface 220, and an I/O interface 222 interconnected via a system bus 224. System bus 224 can include any type or form of infrastructure capable of facilitating communication between one or more components comprising computing system 202. Examples of system bus 224 include, for example, a communication bus (such as an ISA, PCI, PCIe, or similar bus) and a network.

Internal data storage 216 may comprise non-transitory computer-readable storage media to provide nonvolatile storage of data, data structures, computer-executable instructions, and so forth to operate computing system 202 in accordance with the present disclosure. For instance, the internal data storage 216 may store various program and data modules 218, including for example, operating system 232, one or more application programs 234, program data 236, and other program/system modules 238. For example, in a computer system 202 configured as a replica 102, the application programs 234, which when executed, may cause the computer system 202 to perform operations in accordance with the Byzantine fault tolerant state machine replication protocol described herein.

Communication interface 220 can include any type or form of communication device or adapter capable of facilitating communication between computing system 202 and one or more additional devices. For example, in some embodiments communication interface 220 may facilitate communication between computing system 202 and a private or public network including additional computing systems. Examples of communication interface 220 include, for example, a wired network interface (such as a network interface card), a wireless network interface (such as a wireless network interface card), a modem, and any other suitable interface.

In some embodiments, communication interface 220 may also represent a host adapter configured to facilitate communication between computing system 202 and one or more additional network or storage devices via an external bus or communications channel. Examples of host adapters include, for example, SCSI host adapters, USB host adapters, IEEE 1394 host adapters, SATA and eSATA host adapters, ATA and PATA host adapters, Fibre Channel interface adapters, Ethernet adapters, or the like.

Computing system 202 may also include at least one output device 242 (e.g., a display) coupled to system bus 224 via I/O interface 222. The output device 242 can include any type or form of device capable of visual and/or audio presentation of information received from I/O interface 222.

Computing system 202 may also include at least one input device 244 coupled to system bus 224 via I/O interface 222. Input device 244 can include any type or form of input device capable of providing input, either computer or human generated, to computing system 202. Examples of input device 244 include, for example, a keyboard, a pointing device, a speech recognition device, or any other input device.

Computing system 202 may also include external data storage 246 coupled to system bus 224. External data storage 246 can be any type or form of storage device or medium capable of storing data and/or other computer-readable instructions. For example, external data storage 246 may be a magnetic disk drive (e.g., a so-called hard drive), a solid state drive, a floppy disk drive, a magnetic tape drive, an optical disk drive, a flash drive, or the like.

In some embodiments, external data storage 246 may comprise a removable storage unit to store computer software, data, or other computer-readable information. Examples of suitable removable storage units include, for example, a floppy disk, a magnetic tape, an optical disk, a flash memory device, or the like. External data storage 246 may also include other similar structures or devices for allowing computer software, data, or other computer-readable instructions to be loaded into computing system 202. External data storage 246 may also be a part of computing system 202 or may be a separate device accessed through other interface systems.

System Model

In accordance with the present disclosure, we assume an adversary that can choose at any given moment to operate the replicated state machine 100 in any one of three environmental modes. In the asynchronous mode, the adversary can control up to f byzantine nodes and can delay any message in the network by any finite amount. In the synchronous mode, the adversary can control up to f byzantine nodes, but messages between any two non-faulty nodes have a bounded delay. Finally, in the common mode, the adversary can control up to c nodes that can crash or act slow, but messages between any two non-faulty nodes have a bounded delay. In embodiments, the number of participating replicas in n=3f+2c+1.

Cryptography

In accordance with the present disclosure, messages can be digitally signed and in some embodiments, threshold signatures are used. Some embodiments, for example, can use Shoup's non-interactive, publicly verifiable threshold RSA signatures, although other threshold signature schemes can be used.

Threshold signatures are particularly useful for generating short and computationally efficient signatures that allow clients to read from just one replica. In a k-out-of-n RSA threshold signature scheme, each replica holds a share of a private RSA signing key that is used to generate a signature share, and clients need to know only a single public RSA verification key. For a given threshold signature scheme, $\alpha$, we denote $\alpha_i(m)$ to be the signature share of message m generated by replica i. In order to sign a message m, any set of k replicas must each sign m with their share of the private key. The k signature shares $\{\alpha_j(m)|j \in J, |J|=k\}$ can be combined to produce a single signature $\alpha(m)$. This signature $\alpha(m)$ can then be verified by any replica using a single RSA verification operation. In contrast, using traditional RSA signatures would require the replica to execute k separate RSA verifications. As the system grows in scale, this linear cost in both computation and message length can become prohibitive.

Some embodiments in accordance with of the present disclosure, use three different threshold signatures formats: a $\sigma$ threshold signature scheme, with a threshold of 3f+c+1 (out of 3f+3 c+1) for signing messages in the common mode; a $\tau$ threshold signature scheme, with a threshold of 2f+c+1 (out of 3f+3c+1) for the synchronous mode and the view change protocol; and a $\pi$ threshold signature scheme, with a threshold of f+c+1 (out of 3f+3c+1) for the execution protocol and also for the view change protocol.

The replicas can use a public key infrastructure (PKI) for authentication. Clients just need to know the three public keys needed for verification of the respective three threshold signature schemes.

Service Properties

The replicated state machine 100 of the present disclosure provides a scalable fault tolerant implementation of a generic replicated service. The discussion begins by defining an interface for the generic services and for an authenticated data structure framework.

1. Service Interface

In accordance with the present disclosure, a generic replication library can provide the following service interface to implement a deterministic replicated service with state, deterministic operations (requests) performed on the service, and read-only queries. An execution val=execute(S; o) modifies state S of the service according to the operation o on the service and returns an output val. A query val=query (S; q) returns the value of the query q given state S (but does not change state S). These operations and queries can perform arbitrary deterministic computations on the state.

The state S of the service moves in discrete decision blocks. Each decision block contains a sequence of requests. The state of the service at the end of sequence number j can be denoted by $S_j$. The sequence of operations of decision block j, that move the state from $S_{j-1}$ to $S_j$, can be denoted by $req_j$.

In order to support efficient reading from one replica, the present disclosure uses an interface for authenticated data structures comprising: digest(S), proof(o, val, seq) and verify(D, o, val, P). More specifically:

- D=digest(S) returns a short commitment of state S (for example, for a key-value store this could be a Merkle hash).
- P=proof(o, val, seq) returns a proof that operation o was executed as part of the sequence of requests in the decision block seq that resulted in $S_{seq}$. For a read only query q, we write P=proof(q, val, seq) and assume all queries are executed with respect to $S_{seq}$.
- verify(D, o, val, P) returns TRUE if and only if (1) P is a valid proof that o was executed in a decision block; (2) the resulting state after this decision block has a digest of D; and (3) val is the return value for operation o, and similarly for verify(D, q, val, P) for query q and val is the return value of query q.

2. Replication Service Guarantees

In accordance with some embodiments of the present disclosure, the replicated state machine 100 uses n=3f+2c+1 replicas (f and c defined below) to obtain the following three properties:

- Safety can be assured when the adversary is in the asynchronous mode (controlling at most f Byzantine replicas). Roughly speaking, "safety" means (1) any two replicas that make a decision will decide on the same value; and (2) decisions are always reflected in the state S of the service.
- Liveness, in addition to safety, can be assured when the adversary is in the synchronous mode (controlling at most f Byzantine nodes) for a sufficiently long time. Roughly speaking, "liveness" means that client requests are handled in a timely manner.
- Linearity, in addition to safety and liveness, can be assured when the adversary is in the common mode (controlling at most c slow/crashed nodes) for a sufficiently long time. The idea of "linearity" means (1) in each phase of processing, only n messages are sent; (2) the size of each message is fixed (does not grow as function of n); and (3) each client requires just a single message to establish the execution of its request.

3. Fast Reads From Backups

In addition to conventional linearizable reads, the replicated state machine 100 of present disclosure can also support fast read from replicas. A major advantage of these reads is they require just one message from one replica. Using threshold signatures and authenticated data structures, verifying the message authentication requires just one RSA operation and a Merkle based proof.

A consideration when reading from just one replica is that a malicious replica (or a benign but slow one) may provide answers to queries that reflect an old state of the service. To mitigate this, each client can maintain a counter last-op for the sequence number of the latest operation executed and a counter last-q for the sequence number of the query with the latest sequence number it is aware of. The client can then accept only fast read responses from a replica if the response is from a state whose sequence number is at least max{last-op, last-q}.

The discussion will now turn to a description of processing a Byzantine fault tolerant state machine replication protocol in accordance with the present disclosure. As explained above, the protocol can be processed among n=3f+2c+1 replicas. Each replica has a unique identifier in {1, 2, . . . , 3f+2c+1}, which identifies that replica's shares of a private signing key, one such private signing key for each of the three threshold signature schemes described above: σ(3f+2c+1), τ(2f+c+1), and π(f+c+1).

Figure 3:
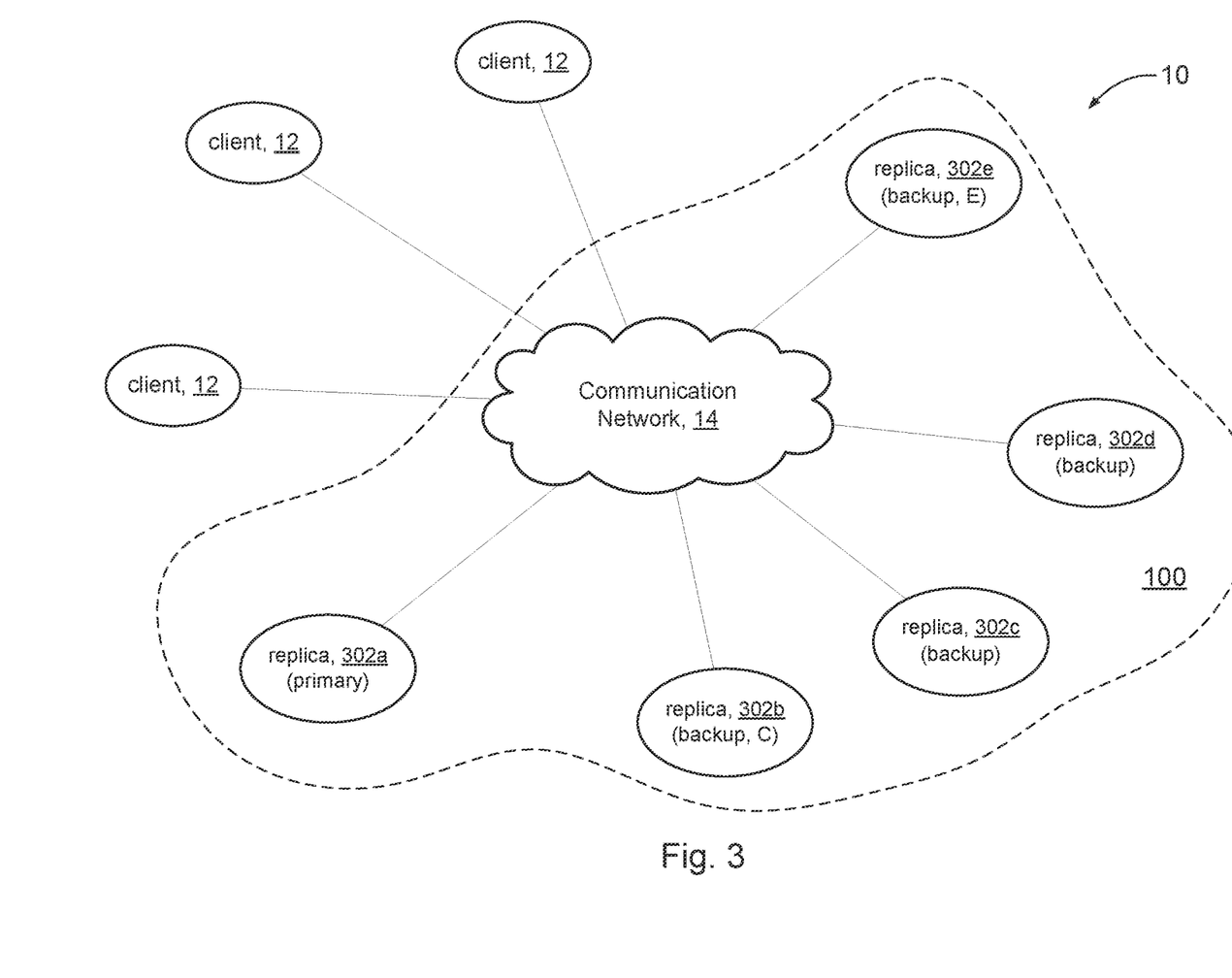
FIG. 3 illustrates an example of a view.

Generally, replicas move from one view to another using a view change protocol. In a "view," one replica is designated a primary and others are designated as backups. The primary is responsible for initialing decisions on a sequence of decisions. For a given view and sequence number, any c+1 non-primary replicas can be designated to be C-collectors (Commit collectors) and any c+1 non-primary replicas can be designated to be E-collectors (Execution collectors). These collectors (the C-collectors and E-collector) are responsible for collecting threshold signatures, combining them and disseminating the resulting signature. This aspect of the present disclosure is discussed below. FIG. 3 shows an example of a view. In this figure, replica 302a is designated the primary, and replicas 302b, 302c, 302d, 302de are designated as backups. In addition, replica 302b is further designated as a C-collector and replica 302e is further designated as an E-collector. The group of replicas that are designated as C-collectors and E-collectors can vary from one instance to another, for example, for load balancing purposes.

Common Mode Operation

Common mode processing is executed as long as the system is synchronous and there are at most c crashed/slow replicas. A crashed/slow replica is different from a faulty replica in that the former replica either does not work at all (crashed) or works very slowly but adheres to the protocol, whereas the latter replica appears to operate but can exhibit arbitrary and otherwise untrusted behavior.

Figure 4A:
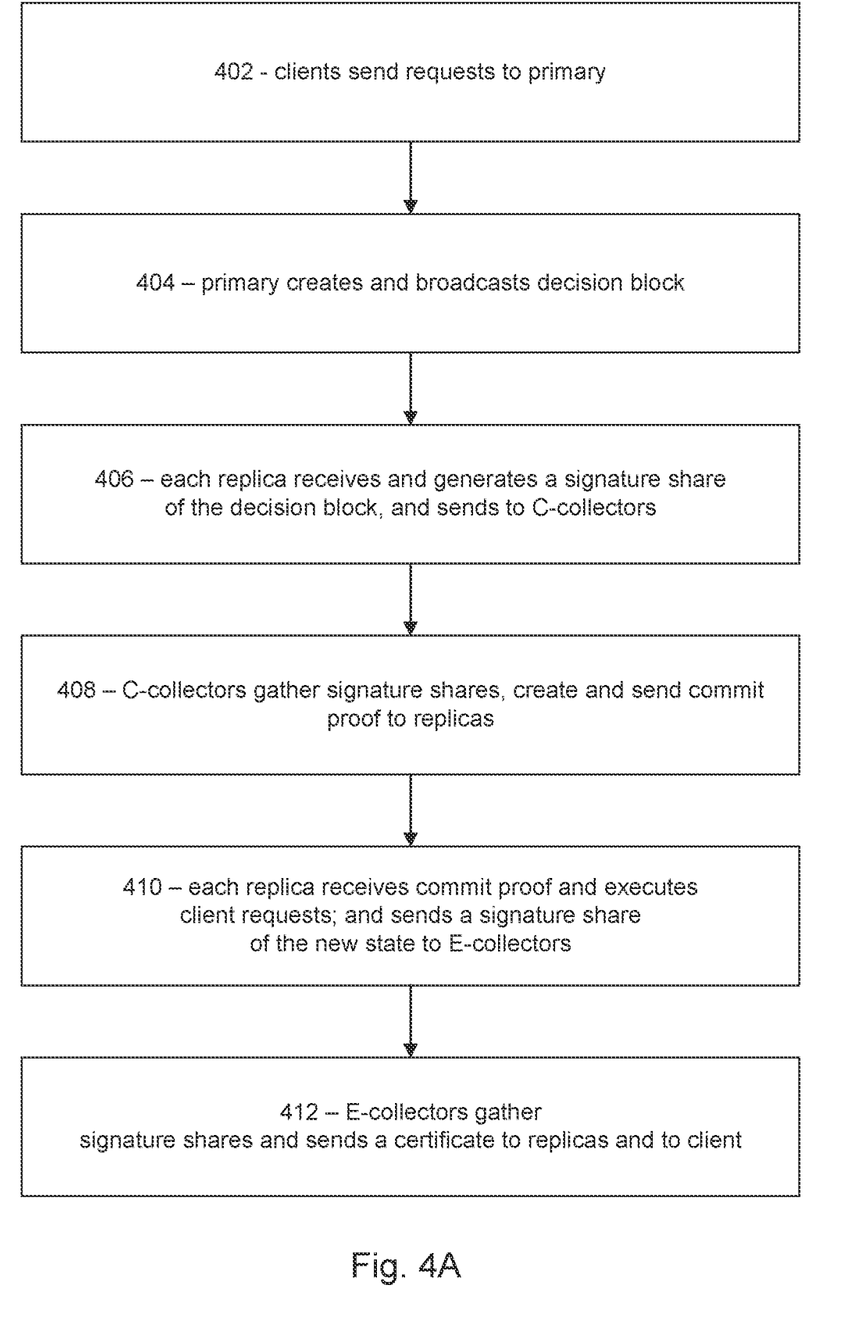
FIGS. 4A and 4B show a high level presentation of an operational flow the protocol in accordance with the present disclosure.

FIG. 4A describes a high level operational flow of processing by the replicated state machine 100 in common mode, in accordance with the present disclosure.

At operation 402, one or more clients send requests to the primary to invoke operations on the service.

At operation 404, the primary can gather one more client requests from the clients, and create a decision block comprising a sequence of client requests. The primary can then broadcast the decision block to the replicas.

At operation 406, each of the replicas can sign their received decision block using their respective share of the private signing key for the σ(3f+c+1) threshold signature scheme. Each replica can send its share of the signed decision block (signature share, decision block signature share) to the C-collectors. From a safety point of view, only one C-collector and one E-collector are sufficient to ensure safety. However, in various embodiments c+1 C-collectors and c+1 E-collectors can be used to ensure liveness. More particularly, the message is sent to all c+1 C-collectors (and likewise, at block 410 below to all c+1 E-collectors).

At operation 408, the C-collectors can gather the signature shares, create a succinct commit proof for the decision block and send the commit proof to the replicas. A commit proof is a valid threshold signature on a decision block that proves that the relevant message in the protocol was received by the required threshold of participants. The commit proof guarantees that no different block can ever obtain a proof (for the same sequence number). This single message has a fixed-size overhead, contains a single signature and is sufficient for the replicas to commit. The use of threshold signatures reduces the quadratic message exchange load of conventional approaches. Furthermore, in some embodiments, using a different C-collector group for each decision block can reduce the load on the primary and balance the load over all replicas. When a replica receives a commit proof, it commits the decision block. The replica then starts the execution phase.

At operation 410, when a replica has a consecutive sequence of committed decision blocks it can execute the operations specified by the client requests that comprise the decision block. The replica can sign a digest of the new state using its share of the private signing key for the π(f+c+1) threshold signature scheme, and sends this to the E-collectors. Persons of skill in the art will understand this is a standard requirement. Maintaining a replicated service using the State Machine Replication approach typically requires all replicas to go through the same sequence of command in order to step through the same sequence of states.

At operation 412, the E-collectors can gather the signature shares, and create a succinct execution proof for the decision block. It then sends a certificate back to the replicas indicating the state is durable and a certificate back to the client indicating that its operation was executed. This single message has fixed-size overhead, contains a single signature and is sufficient for acknowledging individual client's requests, as well as for replicas to be able to serve fast reads later.

Operations 410 and 412 harness authenticated data structures and threshold signatures to provide per-request acknowledgement with only a single linear exchange over an entire block. Once again, by choosing a different E-collector group for each decision block, we spread overall load of primary leadership, C-collection, and E-collection, among all the replicas.

Figure 4B:
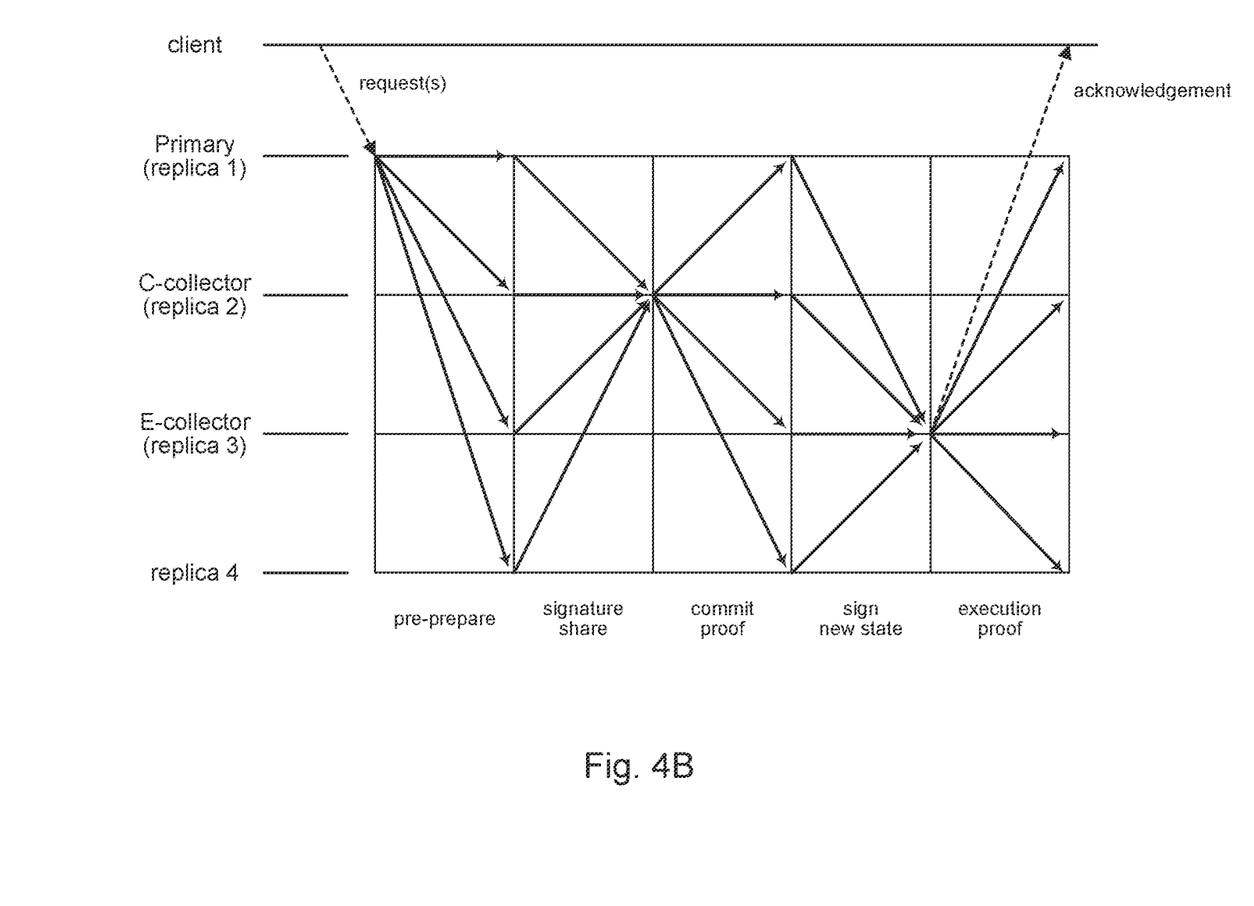

FIG. 4B illustrates an example of the message flow in accordance with the operational flow described in FIG. 4A. A client sends one or more requests to the primary (in this example, replica 1). Although a single client is shown, it will be appreciated that more than one client can send requests to the primary. When the primary collects enough requests, the collection of requests (called a decision block) is broadcast to all replicas (including itself). Each replica signs (using a threshold signature technique) its received decision block, and sends the resulting signature share to the C-collector (in this example, replica 2). The C-collector combines the separate signature shares on the decision block to produce commit proof message that is broadcast all replicas (including itself). Each replica, in response to receiving the commit proof message, executes the requests in its received decision block, which updates its state of the service. Each replica signs a representation of its updated state using a threshold signature technique, and send the resulting signature share to the E-collector (in this example, replica 3). The E-collector produces an execution acknowledgement message that is broadcast to all replicas (including itself). The E-collector also sends the execution acknowledgement message to the client. As can be seen in FIG. 4B, the number of messages sent at each stage will only increase linearly if additional replicas are added. Likewise, the size of each message remains fixed if additional replicas are added.

FIG. 4B shows a single C-collector and a single E-collector. From a "safety" point of view only one C-collector and one E-collector are sufficient to ensure safety. However, as noted above, in various embodiments c+1 C-collectors and c+1 E-collectors can be used to provided liveness.

The discussion will now turn to a more detailed description of common mode operation by the replicated state machine 100 in accordance with the present disclosure.

The Client

Each client k maintains a strictly monotone timestamp t and requests an operation o by sending a ⟨"request", o, t, k⟩ message to what it believes is the primary. The primary then sends the message to all replicas and replicas then engage in an agreement algorithm.

Conventional systems require clients to wait for a linear (f+1) number of replies to accept an execution acknowledgment. By comparison, in accordance with the present disclosure, the client waits for just a single reply message ⟨"execute ack", seq, o, π(root), proof(o, val, seq)⟩ from one of the replicas, and accepts val as the response from executing operation o by verifying that proof(o; val; seq) is a proof that operation o was executed as part of the decision block that resulted in the state whose sequence number is seq, the return value of o was val, the digest of $S_{seq}$ is root. This can be done by checking verify(root, o, val, proof(o, val, seq))==TRUE) and π(root) is a valid signature for root. Upon accepting an execute-ack message, the client can mark operation o as executed and use val as its return value.

The Replicas

The state of each replica includes a log of accepted messages sorted by sequence number, view number and message type. In addition, the state includes the current view number, the last stable sequence number ls, the state S of the service after applying all the committed requests for all sequence numbers up to ls.

Each replica also has an identity i which is an integer in {1, 2, . . . , n}. The identity i is used to refer to the shares of the three private signing keys for the respective threshold signature schemes, namely $\sigma_i$ for the 3f+c+1 (σ) threshold signature scheme, $\tau_i$ for the 2f+c+1 (τ) threshold scheme, and $\pi_i$ for a f+c+1 (π) threshold signature scheme.

As mentioned above and explained in more detail below, replicas can have additional roles of being a primary (Leader), a C-collector (Commit collector), an E-collector (Execution collector), or is only a backup. The primary for a given view can be chosen as view mod n. The primary stores a current sequence number. The C-collectors for a given view view and sequence number seq can be chosen as a pseudo-random group from among the replicas designated as backups (i.e., not the primary) as a function of seq and view. Similarly, the E-collectors for a sequence number seq are chosen as a pseudo-random group from backups as a function of seq. The role of a C-collector is to collect commit messages and send a combined signature back to the replicas to confirm commit. The role of an E-collector is to collect execution messages and send a combined signature back to the replicas and the client so they all have a certificate that proves their request is executed.

Figure 5:
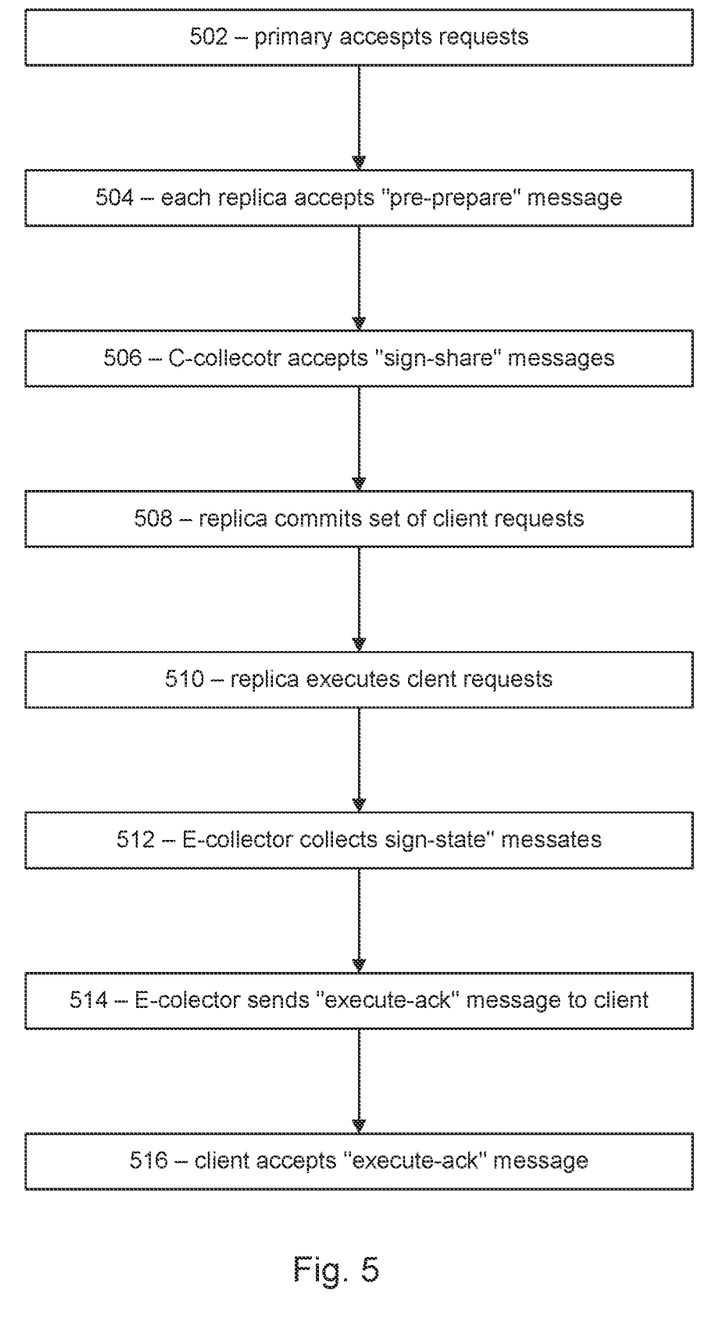
FIG. 5 shows a detailed presentation of an operational flow the protocol in accordance with the present disclosure

FIG. 5 describes additional detail of the operational flow of processing in the common mode.

At operation 502, the primary accepts a ⟨"request", o, t, k⟩ message from client k if the operation o passes authentication and access control rules, if any. The authentication and access control rules will vary from one use case to another. In a banking environment, for example, the query may be a current balance on a bank account. The client has authorization to access their own account, but not the account of another person. The client has access to the account for reading out the balance, but not to write to the account (e.g., to change the balance).

In some embodiments, when the primary accepts a batch of some predetermined number of client requests (decision block) req=($r_1$, $r_2$, . . . $r_b$), the primary can send (e.g., broadcast) a ⟨"pre-prepare", seq, view, req, hash⟩ message to all 3f+2c+1 replicas where seq is the current sequence number, view is the view number, hash=H(req) where H is a cryptographic hash function; e.g., SHA256.

At operation 504, each replica i can accept a ⟨"pre prepare", seq, view, req, hash⟩ message from the primary if: (1) its view equals view; (2) no previous pre-prepare message with the same sequence number seq has been accepted for this view; (3) the sequence number seq is between ls and ls+window, where window is the number of decision blocks that can be executed in parallel; (4) the replica performs its own computation of H(req) and the result equals hash; and (5) each of the client requests in req passes authentication and access control requirements. In response to accepting the ⟨"pre-prepare", seq, view, req, hash⟩ message, replica i can sign hash using its share $\sigma_i$ of the private signing key for the $\sigma$ threshold signature scheme to generate replica i's signature share $\sigma_i$(hash). The replica can send its signature share to the set of C-collectors determined based on seq and view; e.g., by sending a ⟨"sign-share", seq, view, $\sigma_i$(hash)⟩ message to the C-collectors.

At operation 506, a C-collector for a given sequence number seq and a given view view, can accept a ⟨"sign-share", seq, view, $\sigma_i$(hash)⟩ message from a replica i if: (1) its view equals view; (2) no previous sign-share message with the same sequence number seq has been accepted for this view; and (3) the verifiable threshold signature $\sigma_i$(hash) passes the verification test. Upon a C-collector accepting 3f+c+1 signature shares from as many replicas, it can form a combined signature σ(hash) from the accepted signature shares. The C-collector can send a ⟨"full-commit-proof", seq, view, σ(hash)⟩ message to all replicas.

At operation 508, if a replica receives a ⟨"full-commit-proof", seq, view, σ(hash)⟩ message and had accepted the ⟨"pre-prepare", seq, view, req, hash⟩ message (operation 504), and σ(hash) is a valid signature of hash, then the replica can commit req as the set of client requests for sequence number seq.

The discussion of operations in FIG. 5 will now turn to what triggers an execution of the client requests and how clients accept that their requests were executed. Basically, once a replica has a consecutive sequence of committed decision blocks it participates in a two phase execution and acknowledgement protocol. The phases are sign-state and execute-proof. In the sign-state phase, for example, each replica signs its state S using its share $\pi_i$ of the private signing key for the $\pi$ threshold signature scheme to produce its signature share of its state S. The replica sends its signature share to the E-collectors. In the execute-proof phase, each E-collector generates a succinct execution certificate. Each E-collector then sends its execution certificate back to the replicas and also sends each client a certificate indicating its operations was executed.

At operation 510, when all decision blocks up to sequence number seq are committed and req is the committed request for sequence number seq, then replica i updates its state to $S_{seq}$ by executing the client requests in req sequentially on the state $S_{seq-1}$. Replica i then updates its digest on the state root=digest($S_{seq}$) and signs root using its share $\pi_i$ of the private signing key for the $\pi$ threshold signature scheme to compute its signature share $\pi_i$(root). Replica i then sends a ⟨"sign-state", seq, $\pi_i$(root)⟩ message to the set of E-collectors, which are selected based on the sequence number seq.

At operation 512, an E-collector for seq accepts the ⟨"sign-state", seq, $\pi_i$(root)⟩ message from a replica i if (1) no previous sign-state message with the same sequence number seq has been accepted for this view from replica i; and (2) the verifiable threshold signature $\pi_i$(root) passes the verification test. Upon an E-collector accepting f+c+1 signature shares, it combines them into a single signature π(root) for the root root of sequence number seq and sends a ⟨"full-execute-proof", seq, π(root)⟩ message to all replicas.

At operation 514, for each request o in req, the E-collector sends an execution acknowledgement message ⟨"execute-ack", seq, val, o, π(root), proof(o, val, seq)⟩ to the client k that issued request o, where val is the response to request o, proof(o, val, seq) is a proof that request o was executed, val is the response to request o at state $S_{seq}$, and π(root) is a signature of the digest of $S_{seq}$, namely root=digest($S_{seq}$).

At operation 516, the client can accept the ⟨"execute-ack", seq, val, o, π(root), proof(o, val, seq)⟩ message if π(root) is a valid signature and verify(root, o, val, proof(o, val, seq))==TRUE. Upon accepting an execute-ack message, the client can mark request o as executed and set val as its return value.

Query Handling

The discussion will now turn to a description an extremely efficient protocol for handling queries (read only operations) in which the client needs to exchange just one message with one replica. As long as all clocks in the system are synchronized to within Δ seconds of each other this fast query operation guarantees that an accepted value returned represents a valid query on the snapshot of the system that is at most 2Δ seconds old.

Figure 6:
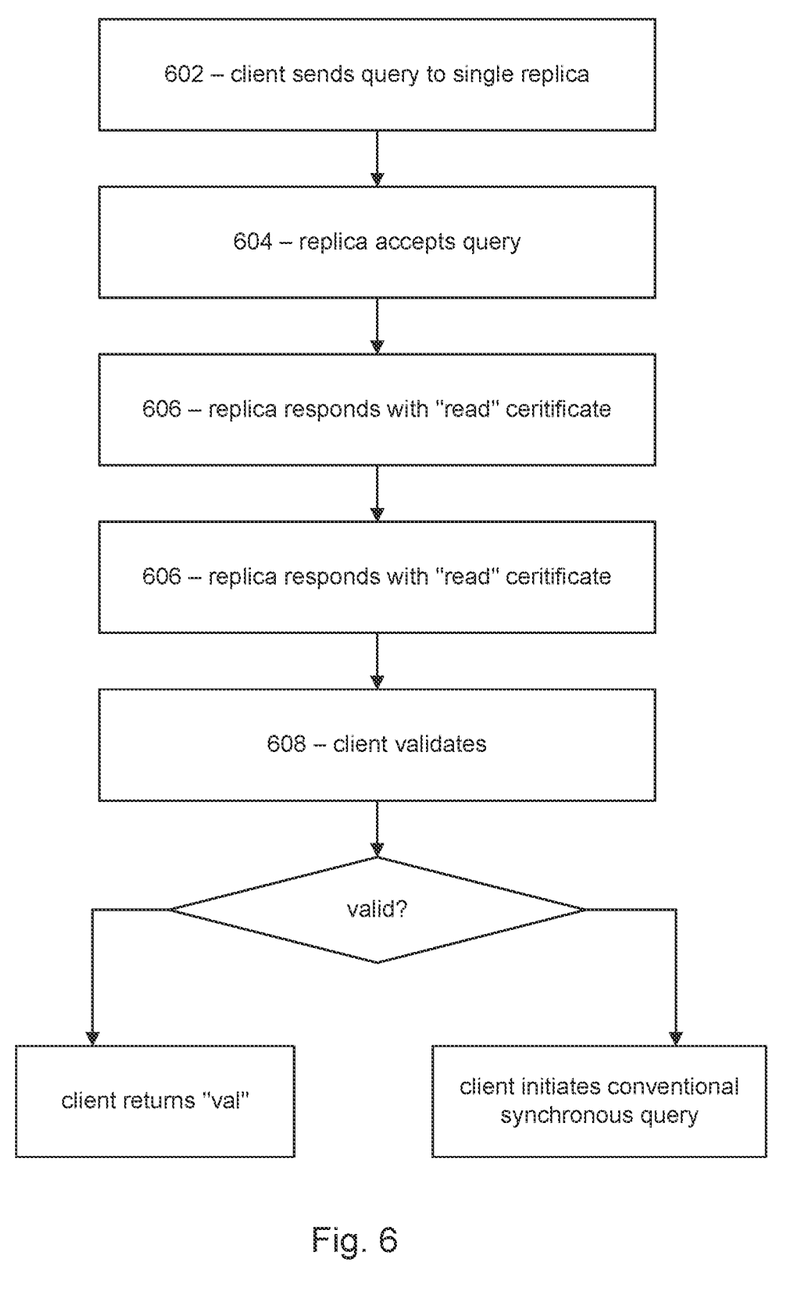
FIG. 6 shows an operational flow for querying.

FIG. 6 shows an operational flow for processing a fast query in accordance with the present disclosure.

At operation 602, a client k sends <<"query", q>> to a randomly chosen replica where q is a read only query.

At operation 604, the replica accepts <<"query", q>> from client k if the query q passes the authentication and access control rules.

At operation 606, upon accepting a query q from client k, the replica responds to client k with read certificate <<"read-certificate", answer, seq, π($root_{seq}$), proof(val, q, seq)>> where seq is the latest executed sequence number, P=proof (val, q, seq) can be a Merkle-based proof that the answer val for query q is the correct answer in state $S_{seq}$ whose digest is $root_{seq}$.

At operation 608, the client returns val if π($root_{seq}$) is a valid signature and verify($root_{seq}$, q, val, P)==TRUE. Otherwise the client initiates a conventional query operation in which the query is sent to all replicas, and waits for responses. The query is successful when f+1 replicas agree on the value of D.

Synchronous Mode Operation

The common mode operation described above guarantees progress as long as there are at most c slow/crashed replicas and the system is synchronous. The synchronous mode operation is a fallback protocol that guarantees progress even if there are f byzantine failures and the system is synchronous.

Figure 7:
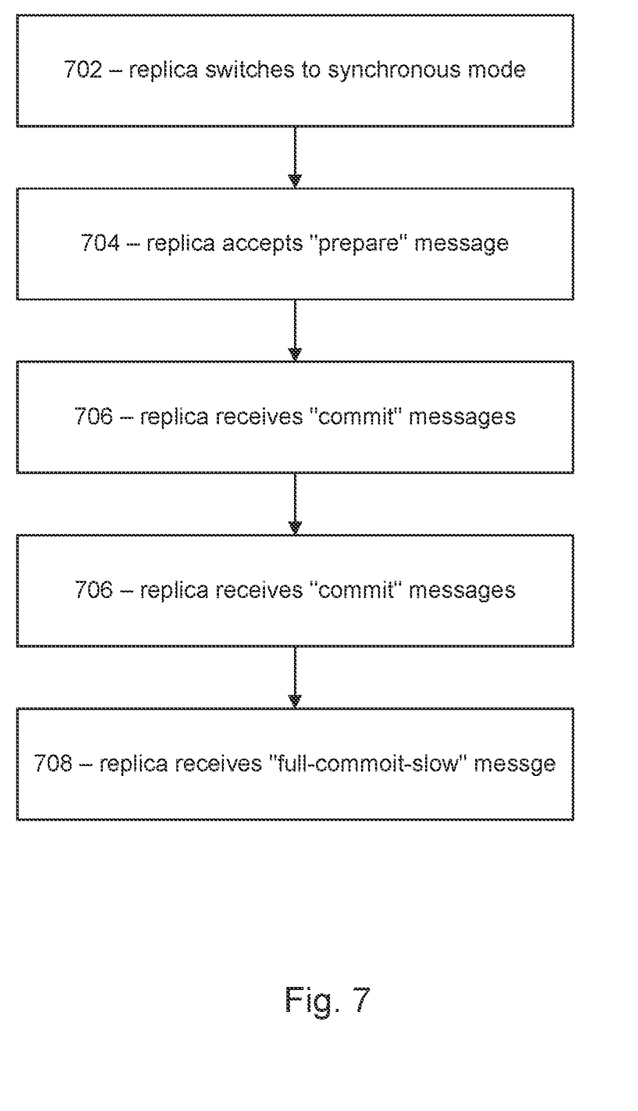
FIG. 7 shows an operational flow for switching to synchronous mode.

FIG. 7 shows an operational flow for processing in synchronous mode in accordance with the present disclosure.

At operation 702, a replica can switch to synchronous mode in response to a timeout condition. In particular, the timeout condition may arise after the replica accepts a pre prepare message (operation 504, FIG. 5) from the primary and a timer expires before the replica receives a full-commit-proof message from a C-collector (operation 508, FIG. 5).

The replica can also switch to synchronous mode in response to replica x sending a <<"prepare", seq, view, $\tau_x$(hash)>> message to all replicas, where $\tau_x$(hash) is the signature share of hash produced using replica x's share $\tau_x$ of the private signing key for the τ threshold signature scheme in response to replica x experiencing the above-described timeout condition.

At operation 704, a replica i accepts the <<"prepare", seq, view, $\tau_x$(hash)>> message from replica x if: (1) its view equals view; (2) no previous prepare message with the same sequence number seq has been accepted for this view; and (3) the verifiable threshold signature $\tau_x$(hash) passes the verification test. Upon accepting 2f+c+1 prepare messages replica i creates a combined signature τ(hash) and sends a <<"commit", seq, val, τ$_i$(hash))>> message to all, where τ$_i$(τ(hash)) is a signature share of the combined signature the replica i just produced, using replica i's share τ$_i$ of the private signing key for the τ threshold signature scheme.

At operation 706, each replica that receives 2f+c+1 commit messages <<"commit", seq, val, τ$_i$(τ(hash))>> with the correct sequence and view numbers, creates a combined signature τ(τ(hash)) and sends <<"full-commit-proof-slow", seq, val, τ(τ(hash))>> to all replicas.

At operation 708, if a replica receives <<"full-commit-proof-slow", seq, view, τ(τ(hash))>> and <<"pre-prepare", seq, view, req, hash>> then it verifies that hash=H(req) and commits req as the sequence of operations for sequence number seq.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method for processing signatures in a state machine replication system comprising N replicas, the method comprising:
   receiving, by a first replica, a share of a signature of a decision block from at least a portion of the plurality of replicas, the share of the signature being generated when a respective replica signs the decision block, wherein the decision block includes a set of requests from a client for a service;
   creating, by the first replica, a combined signature based on the share of the signature block from at least the portion of the plurality of replicas; and
   broadcasting, by the first replica, a message that includes the combined signature to the plurality of replicas, wherein the plurality of replicas use the combined signature to determine whether to process the decision block for the service.

2. The method of claim 1, wherein each share of the signature of the decision block is generated by a respective one of the plurality of replicas using a share of a key, wherein each respective one of the plurality of replicas is associated with a share of the key.

3. The method of claim 1, further comprising:
   determining whether a predetermined number of shares of the signature of the decision block are accepted, wherein the message is broadcast when the predetermined number is received.

4. The method of claim 3, wherein the first replica accepts the share of the signature of the decision block when the share of the signature is verified.

5. The method of claim 1, wherein the combined signature is produced based on at least 3f+c+1 shares of the signature of the decision block, where f is the number of allowable replicas that can be byzantine faulty and c is the number of allowable replicas that have crashed or are slow.

6. The method of claim 1, wherein the message is a proof that the share of the signature was received from a predetermined number of the plurality of replicas and the plurality of replicas can commit the decision block in the state machine replication system.

7. The method of claim 1, wherein the message is a proof that the share of the signature was received from a predetermined number of the plurality of replicas and the plurality of replicas can execute the decision block in the state machine replication system.

8. A non-transitory computer-readable storage medium having stored thereon computer executable instructions for processing signatures in a state machine replication system comprising N replicas, wherein the instructions, when executed by a first replica, cause the first replica to be operable for:
   receiving a share of a signature of a decision block from at least a portion of the plurality of replicas, the share of the signature being generated when a respective replica signs the decision block, wherein the decision block includes a set of requests from a client for a service;
   creating a combined signature based on the share of the signature block from at least the portion of the plurality of replicas; and
   broadcasting a message that includes the combined signature to the plurality of replicas, wherein the plurality of replicas use the combined signature to determine whether to process the decision block for the service.

9. The non-transitory computer-readable storage medium of claim 8, wherein each share of the signature of the decision block is generated by a respective one of the plurality of replicas using a share of a key, wherein each respective one of the plurality of replicas is associated with a share of the key.

10. The non-transitory computer-readable storage medium of claim 8, further operable for:
    determining whether a predetermined number of shares of the signature of the decision block are accepted, wherein the message is broadcast when the predetermined number is received.

11. The non-transitory computer-readable storage medium of claim 10, wherein the first replica accepts the share of the signature of the decision block when the share of the signature is verified.

12. The non-transitory computer-readable storage medium of claim 8, wherein the combined signature is produced based on at least 3f+c+1 shares of the signature of the decision block, where f is the number of allowable replicas that can be byzantine faulty and c is the number of allowable replicas that have crashed or are slow.

13. The non-transitory computer-readable storage medium of claim 8, wherein the message is a proof that the share of the signature was received from a predetermined number of the plurality of replicas and the plurality of replicas can commit the decision block in the state machine replication system.

14. The non-transitory computer-readable storage medium of claim 8, wherein the message is a proof that the share of the signature was received from a predetermined number of the plurality of replicas and the plurality of replicas can execute the decision block in the state machine replication system.

15. A first replica for processing signatures in a state machine replication system comprising N replicas, the first replica comprising:
one or more computer processors; and
a computer-readable storage medium comprising instructions for controlling the one or more computer processors to be operable for:
receiving a share of a signature of a decision block from at least a portion of the plurality of replicas, the share of the signature being generated when a respective replica signs the decision block, wherein the decision block includes a set of requests from a client for a service;
creating a combined signature based on the share of the signature block from at least the portion of the plurality of replicas; and
broadcasting a message that includes the combined signature to the plurality of replicas, wherein the plurality of replicas use the combined signature to determine whether to process the decision block for the service.

16. The first replica of claim 15, wherein each share of the signature of the decision block is generated by a respective one of the plurality of replicas using a share of a key, wherein each respective one of the plurality of replicas is associated with a share of the key.

17. The first replica of claim 15, further operable for:
determining whether a predetermined number of shares of the signature of the decision block are accepted, wherein the message is broadcast when the predetermined number is received.

18. The first replica of claim 17, wherein the first replica accepts the share of the signature of the decision block when the share of the signature is verified.

19. The first replica of claim 15, wherein the combined signature is produced based on at least 3f+c+1 shares of the signature of the decision block, where f is the number of allowable replicas that can be byzantine faulty and c is the number of allowable replicas that have crashed or are slow.

20. The first replica of claim 15, wherein the message is a proof that the share of the signature was received from a predetermined number of the plurality of replicas and the plurality of replicas can commit the decision block in the state machine replication system.

21. The first replica of claim 15, wherein the message is a proof that the share of the signature was received from a predetermined number of the plurality of replicas and the plurality of replicas can execute the decision block in the state machine replication system.

* * * * *